United States Patent [19]

Kanai

[11] Patent Number: 4,996,551
[45] Date of Patent: Feb. 26, 1991

[54] EXPOSURE CONTROL APPARATUS

[75] Inventor: Masaharu Kanai, Tokyo, Japan

[73] Assignee: Fuji Photo Film Co., Ltd., Kanagawa, Japan

[21] Appl. No.: 486,875

[22] Filed: Feb. 20, 1990

[30] Foreign Application Priority Data

Feb. 29, 1989 [JP] Japan .................................... 1-39605
Feb. 20, 1989 [JP] Japan .................................... 1-39606

[51] Int. Cl.⁵ .............................................. G03B 7/08
[52] U.S. Cl. .................................... 354/432; 354/435
[58] Field of Search .............. 354/432, 429, 433, 434, 354/435, 436, 437, 439, 440

[56] References Cited

U.S. PATENT DOCUMENTS

| 3,538,823 | 11/1970 | Wagner | 354/433 |
| 3,664,245 | 5/1972 | Bresson et al. | 354/443 |
| 4,052,726 | 10/1977 | Hopfner et al. | 354/436 |
| 4,172,644 | 10/1979 | Wagner et al. | 354/429 |
| 4,176,929 | 12/1979 | Ito et al. | 354/431 |

FOREIGN PATENT DOCUMENTS

| 56-18933 | 5/1981 | Japan . |
| 57-38419 | 3/1982 | Japan . |
| 57-129424 | 8/1982 | Japan . |

Primary Examiner—Russell E. Adams
Attorney, Agent, or Firm—Young & Thompson

[57] ABSTRACT

An exposure control apparatus has a photometry unit for measuring the brightness at a plurality of divisional areas of a subject screen. A correct exposure time is calculated in accordance with signals obtained by measuring the brightness at the plurality of divisional areas with the photometry unit when a shutter blade is closed. A light-receiving aperture is formed in the shutter blade. The photometry unit or another photometry unit is disposed at the back of the shutter blade to thereby measure light from the subject screen as the shutter blade is opened. When the measured value takes a value corresponding to the exposure time, the shutter blade is closed.

10 Claims, 8 Drawing Sheets

4,996,551

EXPOSURE CONTROL APPARATUS

BACKGROUND OF THE INVENTION

The present invention relates to an exposure control apparatus for a camera, and more particularly to an exposure control apparatus capable of obtaining a correct exposure of a main subject even under a rear lighting or spot illumination.

There is known a method of obtaining a correct exposure suitable for any subject brightness, for example, as disclosed in Japanese Patent Publ. No. 56-18933, Japanese Patent Laid-Open Publ. No. 57-129424 or Japanese Patent Laid-Open Publ. No. 57-38419. According to this method, as the shutter blade is opened, a light-receiving aperture disposed in front of a light-receiving element is opened to measure the available light, and the shutter blade is closed in response to a shutter close signal which is generated when the integrated value of a photocurrent from the light-receiving element reaches a predetermined value. With this exposure control method, photometry is carried out in parallel with the opening of the shutter blade, so that a correct exposure control without time delay can be ensured, and in addition, the mechanism is not complicated.

With the above-described exposure control method, however, the light-receiving element measures the average brightness of the whole field of view, and the reference value of the integrated photocurrent for obtaining the shutter close signal is determined such that the overall density of a photograph can be reproduced at 18% grey level. If there is a great difference in brightness between the main subject and background within the field of view, as in the case of a subject under rear lighting or spot illumination, there arises the problem that an exposure time suitable for a correct exposure of the main subject cannot be obtained.

There is also known a multi-pattern photometry method wherein photometry is carried out for a plurality of regions within a field of view to calculate the exposure time in accordance with a plurality of measured light values. According to this multi-pattern photometry method, an exposure time calculated from a plurality of measured light values is corrected in accordance with a scene condition such as front lighting, rear lighting, spot illumination or the like, the exposure then being determined in accordance with the brightness distribution within the field of view. As a result, if the shutter is opened and closed in accordance with the calculated exposure time, the main subject can be automatically and correctly exposed.

The conventional exposure control method using multi-pattern photometry can obtain a correct photometry and exposure calculation. However, the shutter opening/closing control itself is not monitored at all so that it is impossible to confirm whether the exposure has been carried out or not for the calculated exposure time. As a result, if the shutter opening/closing control is subject to error, this error cannot be corrected thereby resulting in an incorrect exposure.

OBJECTS OF THE INVENTION

It is a principal object of this invention to provide an exposure control apparatus capable of obtaining a correct exposure of a main subject even with an abnormal brightness distribution within the field of view, such as under rear lighting and spot illumination.

It is another object of the present invention to provide an exposure control apparatus capable of closing/opening a shutter blade while monitoring the actual motion thereof, so as to obtain a correct exposure which is the same as that photometrically calculated.

SUMMARY OF THE INVENTION

In order to achieve the above objects, the exposure control apparatus of this invention comprises calculation means for calculating the correct exposure time for a main subject in accordance with measured light values in a plurality of areas within the field of view. During the process of opening the shutter blade, photometry is carried out through a light-receiving aperture formed in the shutter blade, and a shutter blade close signal is outputted from a control circuit when the photometry level reaches the correct exposure level.

BRIEF DESCRIPTION OF THE DRAWINGS

The above and other objects and advantages of this invention will become apparent from the detailed description of this invention when read in conjunction with the accompanying drawings, wherein.

DETAILED DESCRIPTION OF THE PREFERRED EMBODIMENTS

Figure 1:
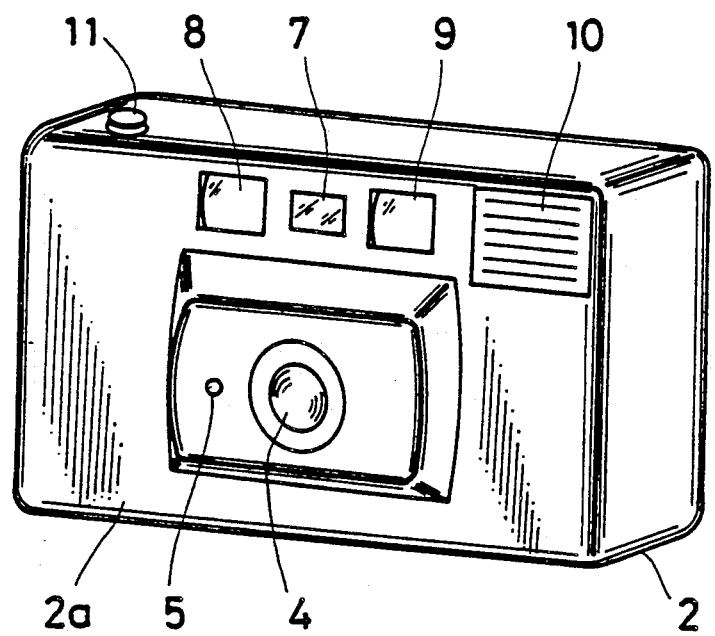
FIG. 1 is a perspective view of a camera using the exposure control apparatus of this invention.

FIG. 1 is a perspective view showing a camera using the exposure control apparatus of this invention. There is mounted on the front of a camera body 2 a taking lens 4 near which a light measuring window 5 is formed. There are disposed above the taking lens 4 a finder 7, a light projecting window 8 and light-receiving window 9 for an auto-focussing unit, and an electronic flash unit 10. Reference numeral 11 represents a shutter button.

Figure 2:
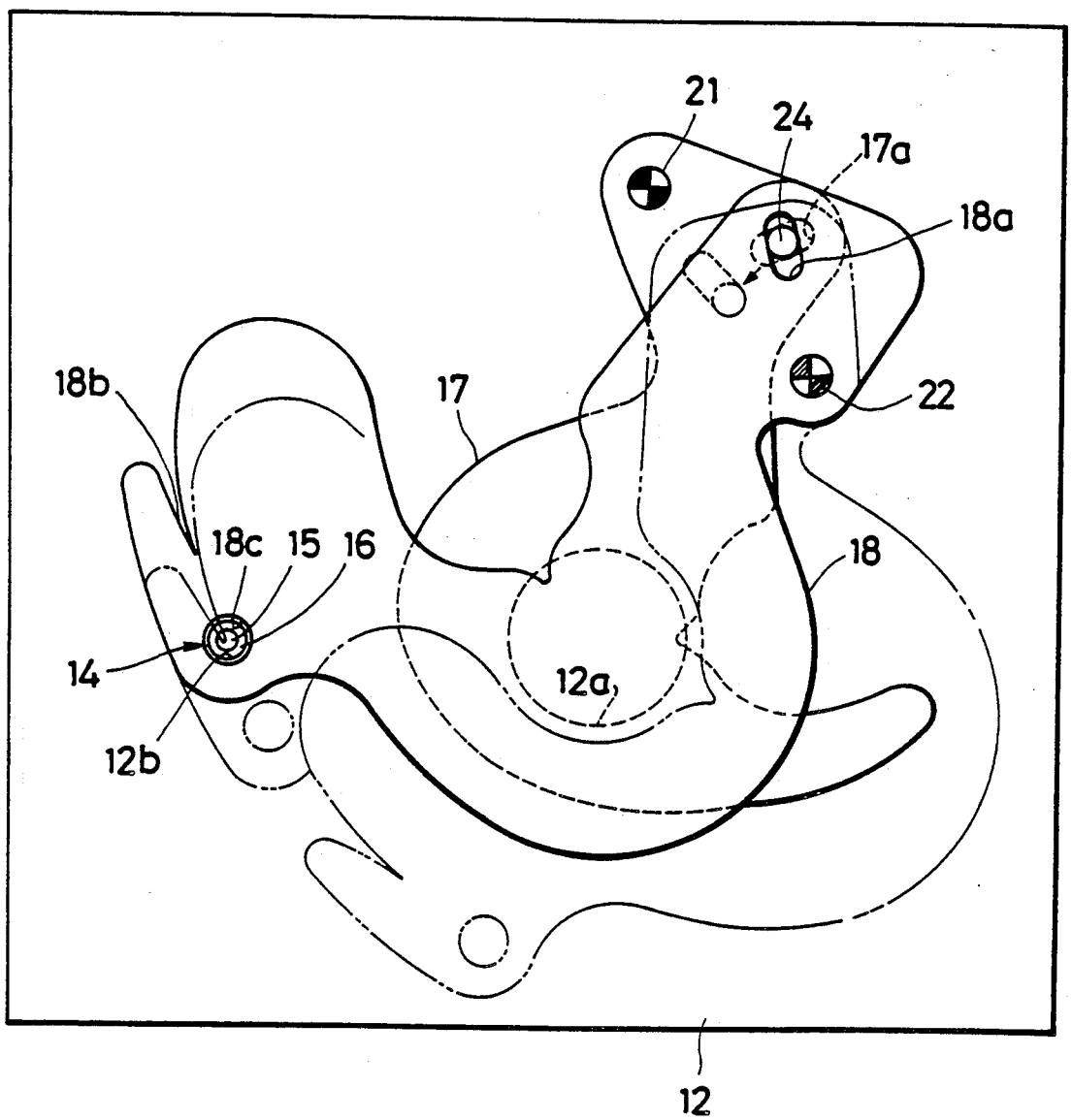
FIG. 2 is a front view of shutter blades used with a first embodiment of this invention.
Figure 3:
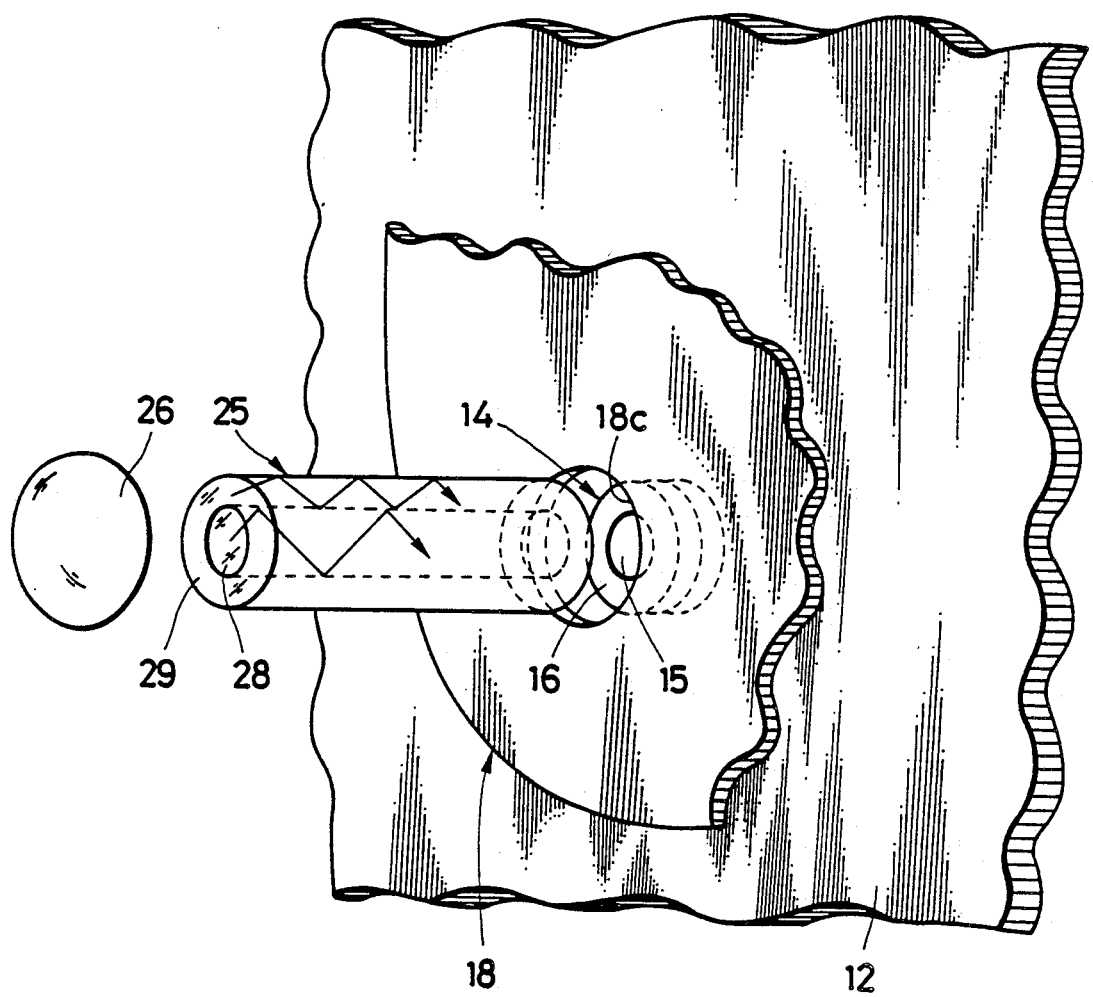
FIG. 3 is a perspective view of the enlarged main portion of the shutter blades shown in FIG. 2.

FIG. 2 shows the shutter mechanism mounted behind the taking lens 4. There are formed in a shutter base plate 12 an exposure aperture 12a and a light-receiving opening 12b. A light-receiving element 14 is fitted in the light-receiving opening 12b so that the elements measures the brightness of the field of view via the light-receiving window 5. As shown in FIG. 3, the light-receiving element 14 is constructed of a silicon photodiode (SPD) 15 for measuring the brightness of the central area of the field of view, and an SPD 16 for measuring the brightness of the peripheral area of the field of view.

Shutter blades 17 and 18 are rotatably coupled to shafts 21 and 22 which are fixed on the shutter base plate 12. The shutter blades 17 and 18 are formed with slotted holes 17a and 18a, respectively, into which a pin 24 is inserted. This pin 24 moves in the direction indicated by an arrow when the shutter button is fully depressed, with the result that the shutter blade 17 rotates in the clockwise direction and the shutter blade 18 rotates in the counter-clockwise direction, thereby opening the exposure aperture 12a. After the lapse of the exposure time determined by an exposure control circuit to be described later, the pin 24 returns to the initial position thereby to close the shutter blades 17 and 18.

At the distal end portion of the shutter blade 18, there are formed a light-receiving aperture 18b in the form of a wedge-shaped recess, and a circular opening 18c. The tip of the wedge of the light-receiving aperture 18b has moved in front of the light-receiving element 14 just when the exposure aperture 12a starts to be opened as the shutter blades 17 and 18 rotate in the directions of opening the exposure aperture. As the shutter blade 18 rotates further in the direction of opening the exposure aperture, the open portion of the opening 18c for the light-receiving element 14 correspondingly increases. The rate of opening of the light-receiving aperture 18b is arranged to be the same as the rate of opening of the exposure aperture 12a during the time the shutter blades 17 and 18 rotate to open the exposure aperture 12a. The opening 18c is of slightly larger diameter than the light-receiving element 14. The opening 18c is disposed in front of the light-receiving element 14 when the shutter blades 17 and 18 are in the closed position indicated by solid lines.

Figure 4:
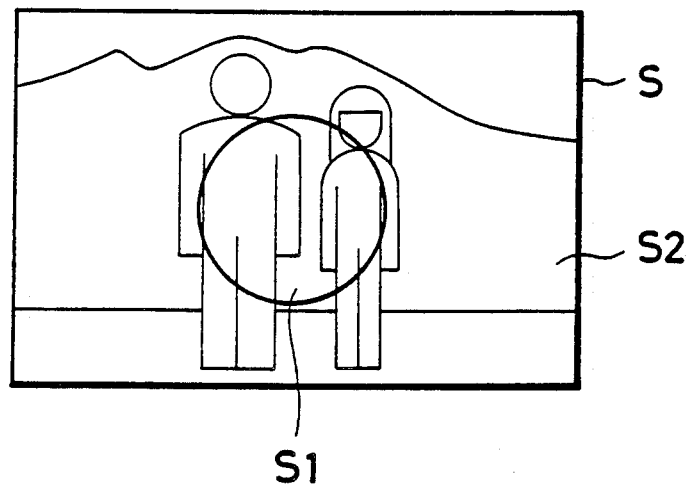
FIG. 4 shows an example of a field of view.

As shown in FIG. 3, there are disposed in front of the light-receiving element 4 a cylindrical light guide 25 and a lens 26. The light guide 25 is comprised by a core 28 made of glass having a high refractive index, and a cladding 29 made of glass having a low refractive index and surrounding the core 28. The lens 26 focusses the subject image on the front end surface of the light guide 25. When the shutter blades 17 and 18 are at the closed position, light from a central area S1 of the field of view S shown in FIG. 4 travels within the core 28 with total internal reflection and is applied via the opening 18c to SPD 15, whereas light from the peripheral area S2 of the subject screen S travels within the cladding 29 with total internal reflection and is applied via the opening 18c to SPD 16.

Figure 5:
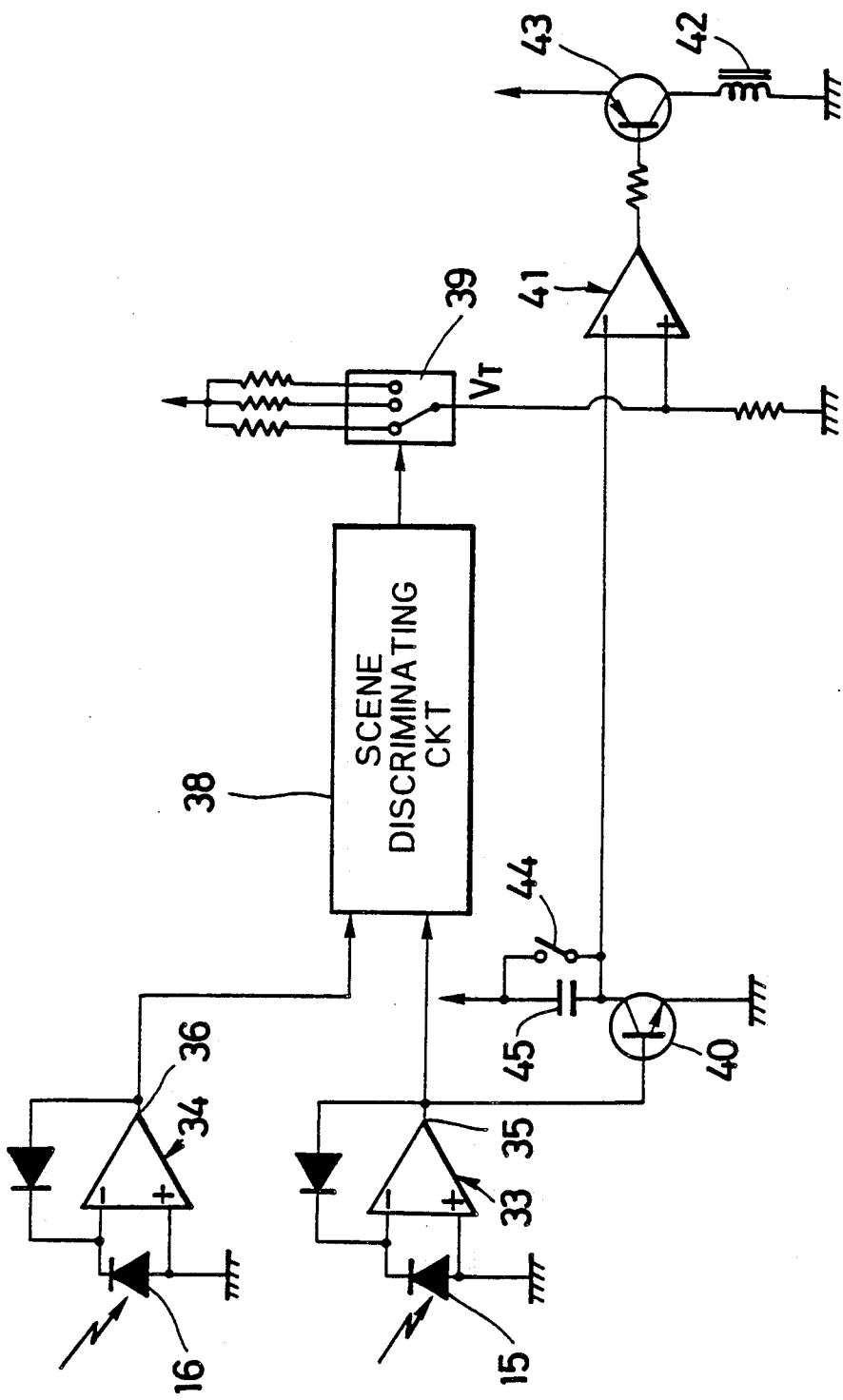
FIG. 5 is a block diagram of the exposure control circuit for controlling the closing/opening of the shutter blades shown in FIG. 2.

FIG. 5 is a block diagram of the exposure control circuit for controlling the open/close time of the shutter blades 17 and 18. SPDs 15 and 16 are connected to operational amplifiers 33 and 34 respectively. The outputs from the operational amplifiers 33 and 34 are inputted to a screen discriminating circuit 38 which compares the output signals at output terminals 35 and 36 of the operational amplifiers 33 and 34 thereby to discriminate the scenes of a field of view such as under front lighting, rear lighting, and spot illumination. The scene discriminating circuit 38 generates a scene discriminating signal in accordance with the discriminated result, and outputs it to an exposure level determining section 39. The exposure level determining section 39 outputs an exposure level signal $V_T$ corresponding to the type of the scene discriminating signal. The exposure level signal $V_T$ is supplied to a non-inverting input terminal of a comparator 41 to determine the inversion level of the comparator 41.

The output terminal 35 of the operational amplifier 33 is also connected to the base of a logarithmic expansion transistor 40. The collector current of the transistor 40 changes with the output voltage of the operational amplifier 33. The collector of the transistor 40 is connected to the inverting input terminal of the comparator 41. The output terminal of the comparator 41 is connected to the base of a transistor 43 which controls a shutter closing magnet 42. This magnet 42 is electrically driven and attracts a shutter closing iron piece. When the electric supply is stopped, the magnet 42 releases the iron piece to close the shutter blades 17 and 18. Reference numeral 44 represents a switch which is turned on when the shutter blades 17 and 18 close, and turned off when the shutter blade 18 masks the light-receiving element 14 as the shutter blades 17 and 18 rotate in the directions of opening of the exposure aperture 12a. Reference numeral 45 represents an integration capacitor for integrating the collector current of the transistor 40.

The exposure control circuit constructed as above operates as follows. Upon depressing the shutter button 11 halfway, the power is turned on. In this condition, the switch 44 is on and the inverting input terminal of the comparator 41 has a high level signal (H signal). Therefore, the transistor 43 is caused to turn on so that the magnet 42 is actuated and the shutter closing iron piece is attracted by the magnet 42 to allow further depression of the shutter button 11.

The light-receiving element 14 measures the subject brightness via the opening 18c of the shutter blade 18 which is then in its closed position. Since the subject image is being focussed on the front end surface of the light guide 25, SPD 15 measures the brightness of the central area S1 of the field of view S where the main subject is often positioned, whereas SPD 16 measures the brightness of the peripheral area of the field of view where the background is often positioned. The signals outputted from the SPD 15 and 16 are amplified by the operational amplifiers 33 and 34 and applied to the scene discriminating circuit 38. On the basis of the signals appearing at the output terminals 35 and 36 of the operational amplifiers 33 and 34, the scene discriminating circuit 38 calculates and outputs a signal for discriminating the field of view. When an ISO 100 film is in use, the value of the brightness at the central area S1 is EVS1 and that of the peripheral area S2 is EVS2 in the field of view; and the calculation is performed as follows:

$$EVS2 - EVS1 > 2 \, EV \tag{1}$$

$$EVS2 - EVS1 \leqq 2 \, EV \tag{2}$$

$$EVS1 - EVS2 > 2 \, EV \tag{3}$$

If the values EVS1 and EVS2 meet the condition (1), the field of view is determined to be a rear lighted scene. If the values meet the condition (2), the field of view is determined to be a front lighted scene. If the values meet the condition (3), the field of view is determined to be spot lighted. There are therefore three types of the scene discriminating signals.

The exposure level setting section 39 supplies to the non-inverting terminal of the comparator 41 an exposure level signal $V_T$ in accordance with the type of the scene discriminating signal. It is assumed now that the exposure level signal $V_T$ takes a reference exposure level signal when the scene discriminating signal represents a front lighted state. If the scene discriminating signal represents a rear lighted state, then the exposure level signal Vt takes a value of the reference exposure level signal shifted to the under-exposure side by for example about 0.5 EV. If the scene discriminating signal represents a spot illumination state, then the exposure level signal Vt takes a value of the reference exposure level signal shifted to the over-exposure side by about 0.5 EV.

When the shutter button is fully depressed, the pin 24 inserted in the slotted holes 17a and 18a of the shutter blades 17 and 18 moves in the direction indicated by an arrow in FIG. 1 by means of a known shutter drive mechanism, so that the shutter blades 17 and 18 are rotated to open the exposure aperture. At the initial stage of this rotation, the opening 18c of the shutter blade 18 moves from in front of the light-receiving element 14 so that the light-receiving element 14 is temporarily shield from light and at the same time the switch 44 turns on. As the shutter blades 17 and 18 rotate further and the exposure aperture 12a becomes gradually opened, the light-receiving aperture 18b moves in front of the light-receiving element 14. Then, SPD 1 again measures the brightness of the central area S1 of the field of view S so that the capacitor 45 starts being charged. The charge speed of the capacitor 45 corresponds to the output signal from SPD 15.

As the shutter blade 18 further rotates and the opening of the exposure aperture 12a increases, the output signal from SPD 15 also increases so that the capacitor 45 is further charged. As the capacitor 45 is charged, the signal voltage applied to the inverting terminal of the operational amplifier 41 decreases. At the moment the signal voltage at the inverting terminal of the comparator 41 becomes lower than the exposure level signal $V_T$ applied to the non-inverting terminals, the output signal from the comparator 41 changes from an L level signal to an H level signal so that the transistor 43 turns off, which stops the supply of power to the magnet 42, resulting in a release of the shutter closing iron piece. The pin 24 thus resumes its initial position and the shutter blades 17 and 18 are closed to terminate the exposure. When the shutter blades 17 and 18 resume the close position, the switch 44 turns on to return to the initial condition.

Since the exposure level signal $V_T$ has a value corrected in accordance with whether the scene is rear lighted or spot lighted, although the control for closing the shutter blades 17 and 18 is performed in accordance with the signal output from SPD 15 measuring the brightness only in the central area S1 of the field of view S, not only can the central area S1 be photographed with a correct exposure but also the exposure for the peripheral area S2 can be controlled properly.

Both the output signals from SPD 15 and SPD 16 may be integrated when the shutter blades 17 and 18 are opened. In this case, since the integrated value corresponds to the average brightness of the total area of the field of view S, the exposure level signal $V_T$ outputted from the exposure level determining section 39 may have the value of the reference exposure level signal shifted to the over-exposure side by for example about 2 EV under rear lighting, and the values of the reference exposure level signal shifted to the under-exposure side by about 2 EV under spot lighting.

Figure 6:
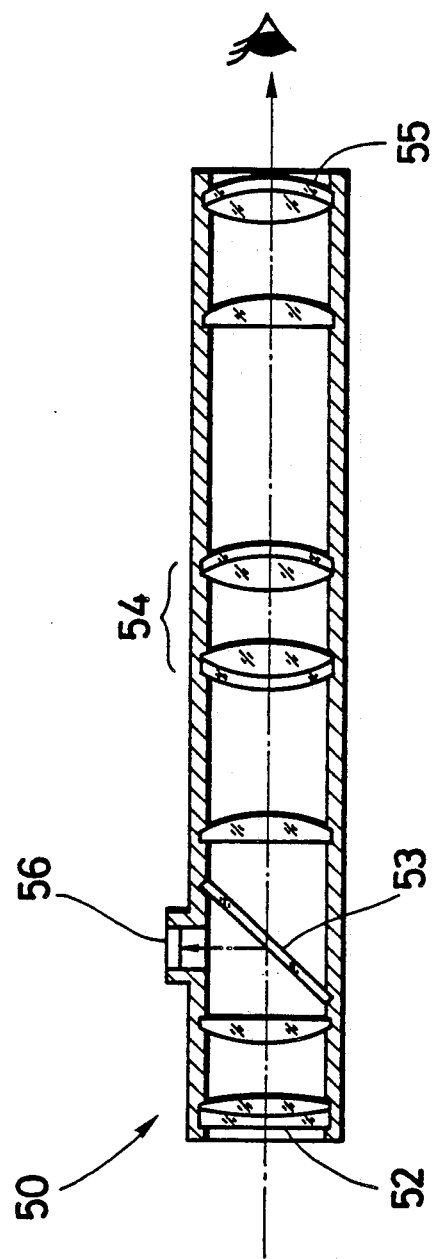
FIG. 6 is a schematic diagram showing a viewfinder used with a second embodiment.

In the second embodiment of this invention, a real image type finder as shown in FIG. 6 is used for discriminating areas of the field of view S. This finder 50 has an objective lens 52, half mirror 53, erecting lens 54, eye-piece 55 and light-receiving section 56. Light from the objective lens 52 is separated by the half mirror 53. Light reflected from half mirror 53 is focussed on the light-receiving section 56, and light passing through half mirror 53 is focussed in front of the erecting lens 54 and then focussed on the front focal plane of the eye-piece 55. The image observed is the same as what the human eye sees through the viewfinder.

Figure 7:
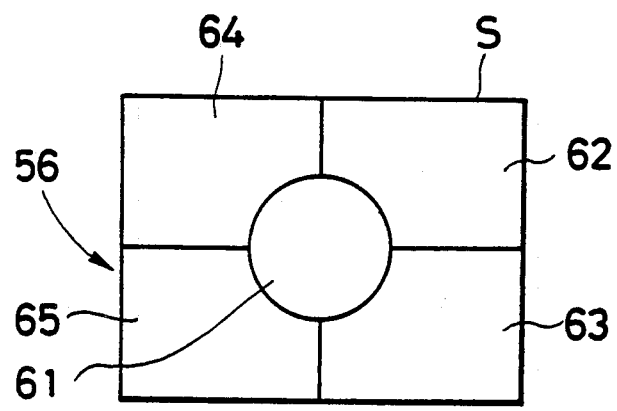
FIG. 7 is a schematic diagram showing the structure of a light-receiving section assembled in the finder shown in FIG. 6.

The light-receiving section 56 is composed of five light-receiving elements 61 to 65 as shown in FIG. 7 covering five divisional areas of the field of view S for measuring the brightness of each area.

Figure 8:
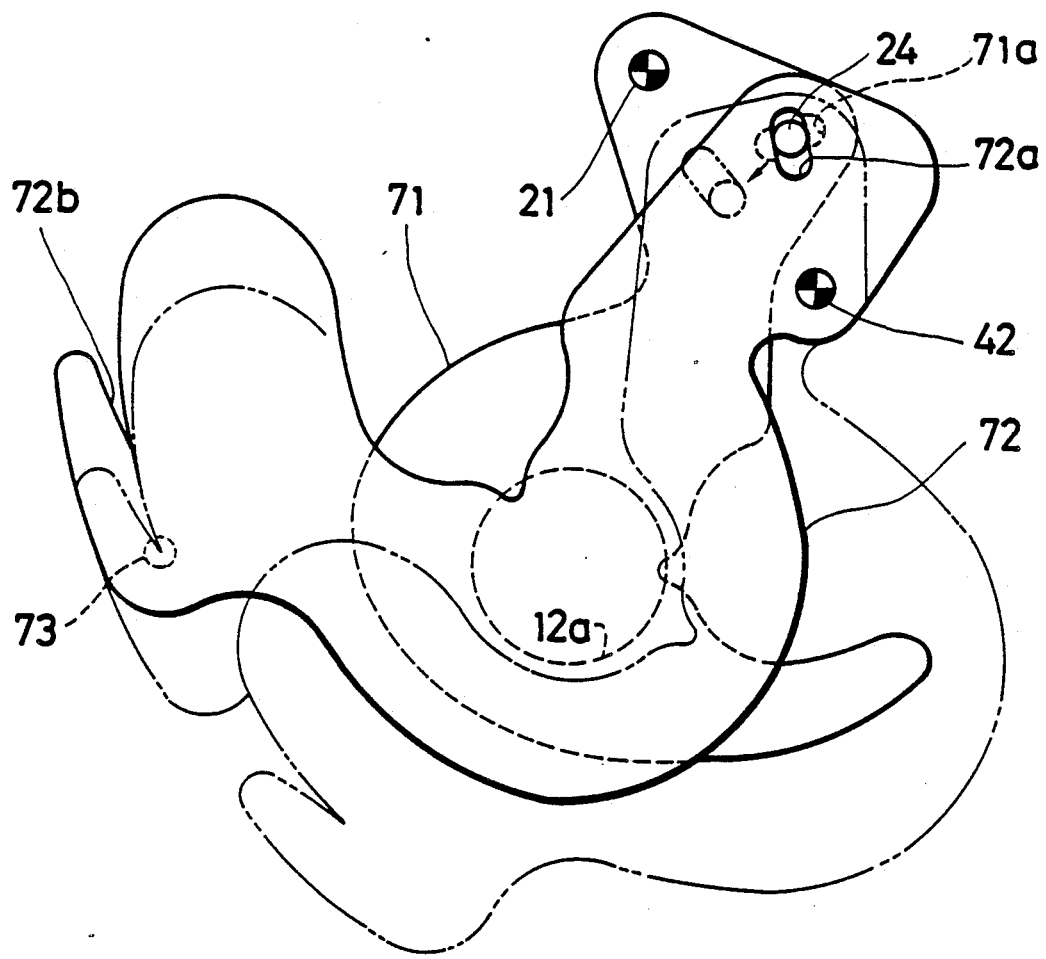
FIG. 8 is a front view of shutter blades used with the second embodiment.

In the second embodiment of this invention, shutter blades 71 and 72 shown in FIG. 8 are used. A light-receiving aperture 72b in the form of a wedge-shaped recess similar to that of the first embodiment is formed in the shutter blade 72. A light-receiving element 73 is mounted behind the blade 72 so that as the shutter blades 71 and 72 are opened, the average brightness of the total area of the field of view S is measured via the light-receiving aperture 75b. The other structure is the same as that shown in FIG. 2, so the description thereof is omitted.

Figure 9:
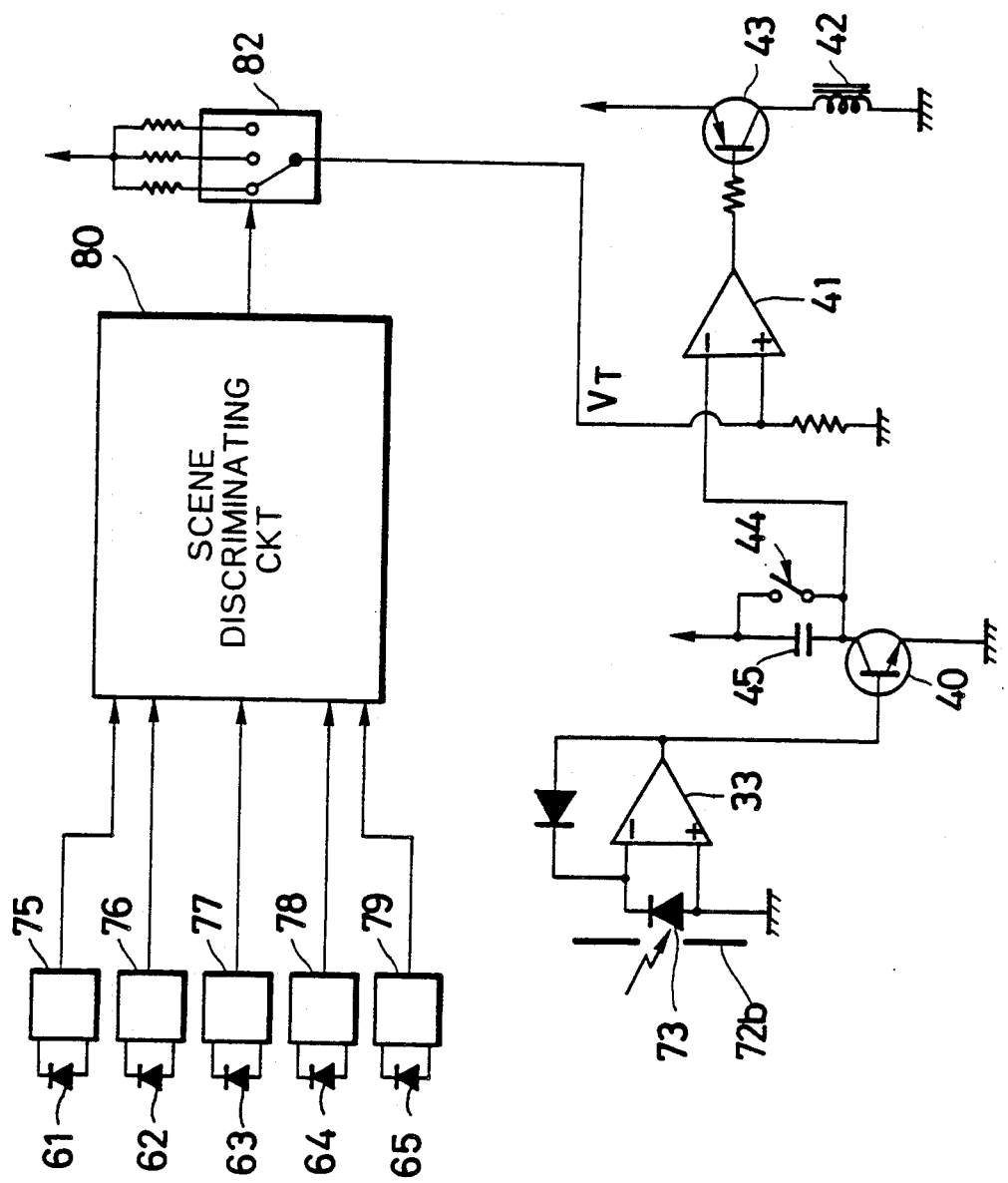
FIG. 9 is a block diagram of the exposure control circuit for controlling the closing/opening of the shutter blades shown in FIG. 8.

The light-receiving elements 61 to 65 of the light-receiving section 56 and the light-receiving element 73 for photometry via the light-receiving aperture 72b are connected to an exposure control circuit as shown in FIG. 9. In this exposure control circuit, output signals from the light-receiving elements 61 to 65 are inputted via logarithmic compression circuits 75 to 79 to a scene discriminating circuit 80 which determines whether the areas of the field of view are under front lighting, rear lighting or spot illumination, in accordance with the five inputted signals. The scene discriminating circuit 80 supplies a scene discriminating signal to an exposure level determining section 82. In addition, as the shutter blade 72 is opened, the average brightness of the total area of the field of view S is measured with the light-receiving element 73. The other structure is the same as that shown in FIG. 5.

According to the second embodiment, when the shutter button 11 is halfway depressed, the areas of the field of view are discriminated by divisional photometry by the light-receiving elements 61 to 65, and a scene discriminating signal corresponding to the discrimination result is inputted to the exposure level determining section 82. The average brightness is measured on one hand by the light-receiving element 37 as the shutter blades 72 and 73 are opened, and the exposure level determining section 82 on the other hand supplies to the non-inverting terminal of the comparator 41 the exposure level signal $V_T$ corrected in accordance with the scene discriminating signal. As a result, as in the first embodiment, even under rear lighting or spot illumination, the main subject can be exposed correctly. In the second embodiment, since the field of view S is divided into five areas and the brightness of each area is measured, a fine exposure level correction can be carried out in accordance with the brightness distribution pattern.

What is claimed is:
1. An exposure control apparatus for controlling the opening and closing of a shutter blade, comprising:
   first photometry means for measuring a plurality of divisional areas of a field of views when said shutter blade is closed;
   calculating means for calculating the correct exposure time for a central area of said field of view by using a plurality of signals obtained by measuring said plurality of areas with said first photometry means;

second photometry means for measuring light from said field of view;

a light-receiving aperture formed in said shutter blade, said light-receiving aperture progressively opening said second photometry means upon progressive opening of said shutter blade;

integrating means for integrating an output signal from said second photometry means; and means for outputting a signal to close said shutter blade when the value integrated by said integrating means reaches a value corresponding to said correct exposure time.

2. An exposure control apparatus according to claim 1, wherein said plurality of areas are a central area and at least one peripheral area of said subject screen.

3. An exposure control apparatus according to claim 1, wherein said first photometry means also serves as said second photometry means, and an opening is formed in said shutter blade, light from said field of view being made incident to said first photometry means via said opening when said shutter blade is closed.

4. An exposure control apparatus according to claim 1, wherein said first photometry means includes a first light-receiving element for receiving light from the central area of said field of view and a second light-receiving element for receiving light from the peripheral area of said field of view.

5. An exposure control apparatus according to claim 4, wherein said second light-receiving element surrounds said first light-receiving element.

6. An exposure control apparatus according to claim 5, wherein there is provided a light guide disposed in front of said opening when said shutter blade is closed, said light guide including a circular columnar light guide section for guiding light from the central area of said subject screen to said first light-receiving element and a tubular light guide section for guiding light from the peripheral area of said subject screen to said second light-receiving element, said tubular light guide section surrounding said circular columnar light guide section.

7. An exposure control apparatus according to claim 4, wherein said integrating means integrates a signal from said first light-receiving element as said shutter blade is opened.

8. An exposure control apparatus according to claim 1, wherein said first photometry means is disposed in the focal plane of a real image type finger.

9. An exposure control apparatus according to claim 8, wherein said real image type finder comprises an objective lens, an erecting lens, and an eye-piece, with a half mirror slanted by 45° being interposed between said objective lens and said erecting lens, and light reflected by said half mirror is directed onto said first photometry means.

10. An exposure control apparatus according to claim 9, wherein said second photometry means is disposed in front of a camera body.

* * * * *